(12) United States Patent
Vogel

(10) Patent No.: US 6,873,407 B2
(45) Date of Patent: Mar. 29, 2005

(54) MULTIPLE BEAM PATH SURVEYING INSTRUMENT

(75) Inventor: Michael Vogel, Schleifreisen (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 10/446,178

(22) Filed: May 27, 2003

(65) Prior Publication Data

US 2004/0017559 A1 Jan. 29, 2004

(30) Foreign Application Priority Data

May 27, 2002 (DE) .......................................... 102 24 147

(51) Int. Cl.$^7$ .............................................. G01B 11/26
(52) U.S. Cl. ................. 356/141.4; 356/138; 356/141.1
(58) Field of Search ........................... 356/138, 139.06, 356/140, 141.1, 141.3, 141.4, 151.1–151.3; 359/429; 33/281

(56) References Cited

U.S. PATENT DOCUMENTS

| | | | | |
|---|---|---|---|---|
| 3,874,087 A | * | 4/1975 | Nunlist ..................... | 33/275 R |
| 5,100,229 A | * | 3/1992 | Lundberg et al. .......... | 356/3.12 |
| 5,440,112 A | * | 8/1995 | Sakimura et al. ......... | 250/203.1 |
| 6,133,998 A | * | 10/2000 | Monz et al. ............. | 356/141.4 |

FOREIGN PATENT DOCUMENTS

| | | |
|---|---|---|
| DE | 38 38 512 C1 | 1/1990 |
| DE | 90 07 731.8 | 12/1994 |
| DE | 199 22 341 A1 | 11/2000 |
| EP | 0 281 518 A2 | 9/1988 |
| GB | 2215478 A * | 9/1989 ............ G01C/3/18 |

OTHER PUBLICATIONS

Feist, Wieland, u.n.: Elta S 10 und Elta S 20 von Carl Zeiss, Systemtachymeter einer neuen Generation. In: Vermessungs–technische Rundschau, 60, H.2, 3, Spril 1998, S. 104–127.

* cited by examiner

Primary Examiner—Thomas H. Tarcza
Assistant Examiner—Isam Alsomiri
(74) Attorney, Agent, or Firm—Dinsmore & Shohl LLP

(57) ABSTRACT

A multiple beam path surveying instrument is provided, which possesses an upper part that is rotatable about a vertical axis and which comprises a telescope body that can be swiveled about a tilt axis, with the vertical and tilt axes orthogonally intersecting at an intersection point S. At least two optical arrangements with optical beam paths are set up inside the telescope body. Driving and/or adjustment devices are provided for rotating the upper part about the vertical axis and the telescope body about the tilt axis. Further, measuring systems for determining the rotational angle of the upper part of the survey instrument about the vertical axis and the telescope body about the tilt axis are provided. A computer system may be used to evaluate the measurements, determine, display and/or record the measurement results, as well as to control the driving and adjustment devices for the telescope body and the upper part.

33 Claims, 8 Drawing Sheets

MULTIPLE BEAM PATH SURVEYING INSTRUMENT

BACKGROUND OF THE INVENTION

The present invention is directed to a surveying instrument with multiple beam paths, and in particular, to a surveying instrument with multiple beam paths capable of different functions or different magnification characteristics. The multiple beam paths may be used to produce, for instance, coarse-lock and fine-lock beam paths, and/or camera beam paths.

In surveying, tacheometers are known, an example of which is referred to as a total station and which represent a combination of a theodolite with vertical and horizontal angle measuring systems and a distance meter. This distance meter is usually integrated into the telescope of the theodolite. A video tacheometer is an instrument that, in addition to the functions of a tacheometer, also comprises at least a video camera.

From DE-GM 90 07 731, a measuring instrument is known for determining the position of optoelectronically representable spatial points, which includes a measuring head with a target acquisition device and a distance-measuring device. The sighting axes of the target acquisition and distance-measuring devices are accurately aligned with each other and run to the axis of motion of the measuring head at a predetermined angle. In concrete terms, this instrument is equipped with a wide-angle camera and a telecamera placed on the distance meter and uses them as a sighting aid for the distance meter. The sighting axes of these cameras and of the distance meter run parallel and at a certain distance to one another. In other words, there exists a parallax between the axes. The disadvantage here is that the eccentricity of the cameras in relation to the tilt axis (elevation axis) has a negative effect both on the sighting of the distance meter and the angle-measuring device. The parallax needs to be taken into consideration in either case.

From EP 0 281 518 B1, a telescope for a video theodolite is known, which avoids the disadvantage that the parallax presents for angular measurement. The camera is connected to the telescope through an additional optical system. However, in order to cover any additional instabilities caused by the extra optics, a reference mark must be arranged in the graticule plane of the telescope and imaged via the extra optics. The considerable expenditure on the optical components required and the small field of view resulting from a camera connected to the telescope thus constitute disadvantages.

The disadvantage of a small field of view has been eliminated in a telescope described in Allgemeine Vermessungsnachrichten, Issue 2, 1993, pages 63 to 65, in connection with FIG. 3 thereof. Briefly, a switching prism is used to optionally place a second optical system with a shorter focal length in front of a CCD camera, so as to obtain a larger field of view. The second optical system, however, also lies in an eccentric position in relation to the telescope optics. Another disadvantage of this arrangement is the considerable expenditure on the optical components required.

An article by Feist et al., entitled "Elta S10 und Elta S20 von Zeiss, System-tachymeter einer neuen Generation" published in Vermessungstechniscbe Rundschau (60), Issues 2 and 3, April 1998, shows in FIG. 5 thereof, a telescope where the beam paths for an optical telescope, for a distance meter and for fine lock are on the same optical axis, i.e., they are arranged coaxially to each other. Once again, the considerable expenditure on the optical components and assemblies required, as well as the fact that the existing CCD camera cannot be focused represent disadvantages which make any use of it as a video tacheometer impossible.

Accordingly, it is the primary object of the present invention to eliminate the disadvantages of the prior art and to create a surveying instrument with several switchable imaging, measuring and/or observation beam paths. Moreover, it is an object of the present invention to provide an instrument that is capable of providing several beam paths at minimal expenditure on optical components, and which allows the switching of beam paths to a position of normal use with high accuracy and in as little time as possible.

SUMMARY OF THE INVENTION

The present invention overcomes the disadvantages of previously known surveying instruments by providing an instrument capable of several switchable imaging, measuring and/or observation beam paths.

According to an embodiment of the present invention, a surveying instrument is provided in which the optical or sighting axes enclose resultant angles, whose vertices lie at the intersection point of the tilt and vertical axes, or close to it. These individual sighting axes can be set in the telescope body in each position of normal use. For this purpose, two angles, $\alpha_n$ and $\beta_n$, are required in a general way for each beam path, which represent a relevant relationship to the horizontal and vertical measuring devices of the surveying instrument and relate to the traditional optical axis $ZA_0$, being the axis of the telescope in most cases.

According to another embodiment of the present invention, a multiple beam path surveying instrument is provided in which the optical or sighting axes of the optical arrangement run vertically to the tilt axis. In such an instrument, the optical or sighting axes of the optical arrangement lie in a plane that is orthogonal to the tilt axis. As a result, setting the various optical arrangements in a desired direction can be easily achieved by swiveling the telescope body about the tilt axis.

According to another embodiment of the present invention, a surveying instrument is provided in which the optical or sighting axes of the optical arrangement can enclose angles with the tilt axis which are different from 90° and whose vertices lie at the intersection point of the vertical and tilt axes. In an instrument of this type, the optical or sighting axes of the optical arrangement necessarily do not lie in a single plane. Setting the various optical arrangements in a desired direction is generally achieved by rotating an upper part of the survey instrument about the vertical axis, and by rotating the telescope body about the tilt axis.

Accordingly, it constitutes an advantage, especially for a video tacheometer or a video theodolite, if the telescope body is provided with a telescope beam path, at least one camera beam path with an objective and a matrix receiver element, and/or a minimum of one additional optical arrangement that projects collimating or light marks on a target or object. Among other things, the light marks or signals projected this way can serve to transmit information between the measuring and target spots. A distance-measuring arrangement can also be set up inside the telescope body.

With a view to ensuring that the individual optical arrangements are accurately set in a desired target position by rotating the telescope body about the tilt axis and/or rotating the upper part of the survey instrument about the vertical axis, it is of particular advantage if the optical and sighting axes of the individual optical arrangements enclose fixed angles $\alpha_n$ to each other, with n=1; 2; 3 . . . (where n is an integer greater than zero).

In order to allow the precise and also the controlled setting and alignment of the optical axes of the optical arrangements in a desired target position by pivoting the telescope body about the tilt axis and/or rotating the upper part of the survey instrument about the vertical axis, manual operating devices or computer-controlled driving and adjustment devices are provided as well. Accordingly, it is of advantage if the optical arrangements can, by means of the driving devices, be set manually or in a computer-controlled manner to positions that differ from one another by the angle $\alpha_n$.

Further, it is equally advantageous and something that can be achieved with little technical effort if suitable mechanical arresters are provided for positioning and fixing the optical arrangements in a desired target position. To this effect, such an arrester is to be provided for each of these sighting axes $ZA_1$ to $ZA_n$. Locking devices or suitable mechanical stops, detents for example, could be provided between the support and the telescope body as advantageous mechanical arresters, with those locking devices and stops being adjustable and lockable in relation to the telescope body or the support.

In order to ensure fast and accurate and computer-controlled adjustment of the various optical arrangements in the desired target position, it is advantageous if electric switching means are assigned to each sighting axis, which then switch off the driving device rotating the telescope body about the tilt axis and/or the upper part of the survey instrument about the vertical axis once the optical arrangements have arrived at the desired target position. Like the driving and adjustment devices, the electric switching means can be directly controlled by the computer. The angles $\alpha_n$ and $\beta_n$, or analog data are then stored in the computer and can be used to control the driving and adjustment devices accordingly. The angles, identified by $\alpha_n$ and $\beta_n$, represent a reference to the horizontal and vertical angle-measuring device of the instrument and relate to the traditional optical or sighting axis $ZA_0$.

According to yet another embodiment of the present invention, a surveying instrument is provided that includes several optical or sighting axes that intersect at an intersection point of a tilt axis and a vertical axis of the instrument. The sighting axes enclose resultant angles, with the vertices of those angles located at the intersection point or close to it. Using a motorized or mechanical surveying instrument, the individual sighting axes can be set to the relevant position of normal use. For this purpose, $\alpha_n$ and $\beta_n$ may be required in a general way for each beam path.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

Figure 1A:
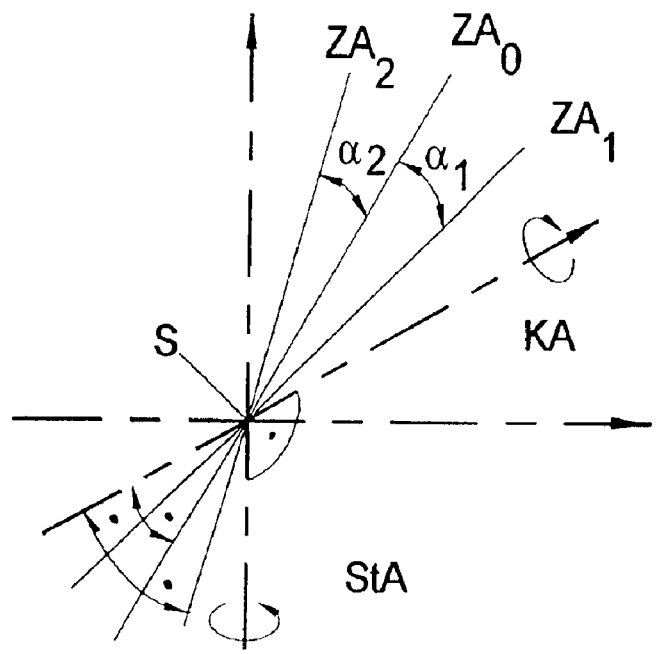
FIG. 1a is a schematic representation of the position of the vertical, till and sighting axes to each other in a perspective view, with the sighting axes running vertically to the tilt axis.
Figure 1B:
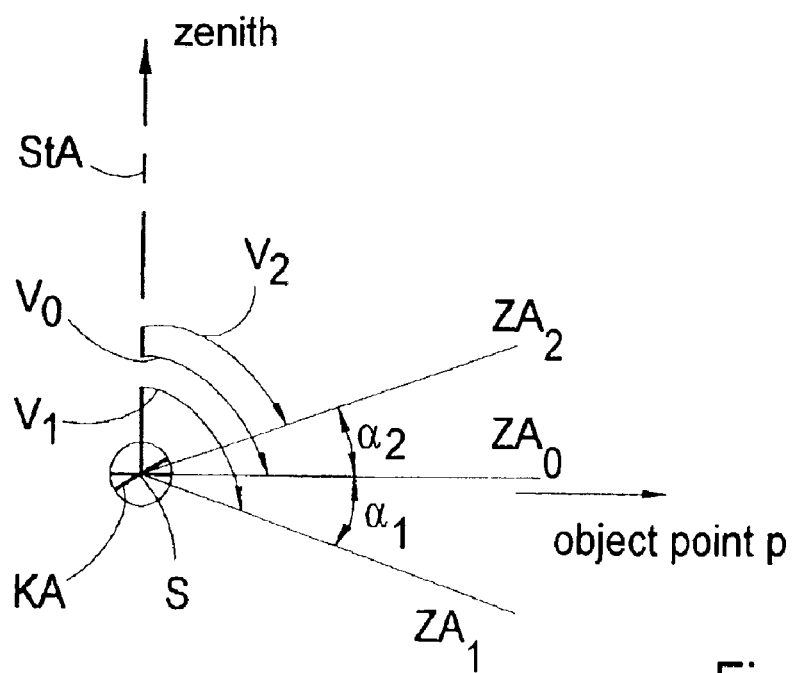
FIG. 1b is a schematic representation of the position of the sighting axes in the plane vertical to the tilt axis.

FIG. 1a shows the relative positions of several individual axes according to an embodiment of the present invention, which are of significance for taking measurements using a surveying instrument, such as a theodolite or tacheometer. A vertical axis StA is shown oriented substantially vertically, or lengthwise with respect to the page. A tilt axis KA is shown orthogonal to the vertical axis StA and is oriented substantially horizontally, or widthwise with respect to the page. Referring briefly to FIG. 1d the upper part of the surveying instrument is rotatable about the vertical axis StA. The tilt axis KA is located in the upper part of the surveying instrument and runs orthogonally to the vertical axis StA. The telescope body of the survey instrument is thus swivelable about the tilt axis KA. Referring back to FIG. 1a the optical axes of different optical arrangements in the surveying instrument that form the sighting axes $ZA_n$(n=0; 1; 2; . . . ) intersect at a common intersection point S. As can be seen from FIG. 1a and even better from FIG. 1b, the three sighting axes $ZA_0$ to $ZA_2$ illustrated stand vertically on the tilt axis KA. The right angles, which the sighting axes $ZA_0$ to $ZA_2$ form with the tilt axis, are highlighted by a dot in FIG. 1a. The angles $\alpha_n$(n=1, 2, . . . ), which enclose the neighboring sighting axes $ZA_0$ and $ZA_1$ or $ZA_0$ and $ZA_2$, are marked $\alpha_1$ and $\alpha_2$. The vertices of these angles $\alpha_1$ and $\alpha_2$ lie at the common intersection point S.

In the following discussion, the angles $\alpha_n$ are looked at first, with the angles $\beta_n$(reference to the vertical angle measuring device) being considered zero. This means, a special case is being described here where all optical axes or sighting axes run vertically to the tilt axis KA and are, therefore, in one plane, on which the tilt axis stands vertically. In FIG. 1b, $V_0$ to $V_2$ denote vertical angles. In surveying, the vertical angle is the angle between the zenith of the instrument and the object point lying in the vertical plane and is sighted through a sighting axis. The orientation of the vertical angle measuring system in a surveying instrument is defined in such a way that a vertical angle $V_0$ of 90° (100 gon) is obtained when an object point lying in the horizon is being sighted (FIG. 1b).

If there are several optical or sighting axes in the surveying instrument which, as shown in FIG. 1b, run orthogonally to the tilt axis KA and intersect at the intersection point S, the following angle relationships can be deduced:

$$V_1 = V_0 + \alpha_1 \qquad [1]$$

$$V_2 = V_0 - \alpha_2 \qquad [2]$$

Therefore, the sights of the optical or sighting axes $ZA_1$ and $ZA_2$ lie at the vertical angles $V_1$ and $V_2$, with the object point P being observed with respect to the sighting axis $ZA_0$ at the angle $V_0$. If the object point P is to be sighted with a different optical arrangement of the surveying instrument, the vertical angle $V_0$ must be reset on the vertical divided circle of the instrument. Accordingly, the following relationship can be derived for sighting with the sighting axis $ZA_1$ (FIG. 1c):

$$V_{0new} = V_{0old} - \alpha_1 \qquad [3]$$

The sights of the optical or sighting axes $ZA_1$ and $ZA_2$ equally result from the relationships [1] and [2]. If a changeover from the currently used sighting axis $ZA_1$ to the sighting axis $ZA_2$ is to be effected, the angle $\alpha_1$ must be added according to the relationship [3].

In a general form, the relationships can be described as follows. The vertical angle $V_0$ is in the position i on the vertical divided circle, and one observes an object point P using the optical or sighting axis $ZA_n$. If a different optical arrangement of the surveying instrument is to be used for an observation, i.e., another sighting axis is to be switched on, a new vertical angle V results at the position i+1, namely, $V_{0i+1} = V_{0,1} - \alpha_{n,m}$.

This also results in new vertical angles at which the sights of the other optical or sighting axes lie. Then, the general relationship reads as follows:

$$V_{m,i+1} = V_{0,i+1} + \alpha_{n,m} \qquad [4]$$

The parameter n corresponds to the activated optical or sighting axis $ZA_n$, and the angle $\alpha_{n,m}$ is known and corresponds to the angle between the sighting axis m being switched off and on. This angle is to be inserted in the general form [4] with the correct algebraic sign.

Figure 2:
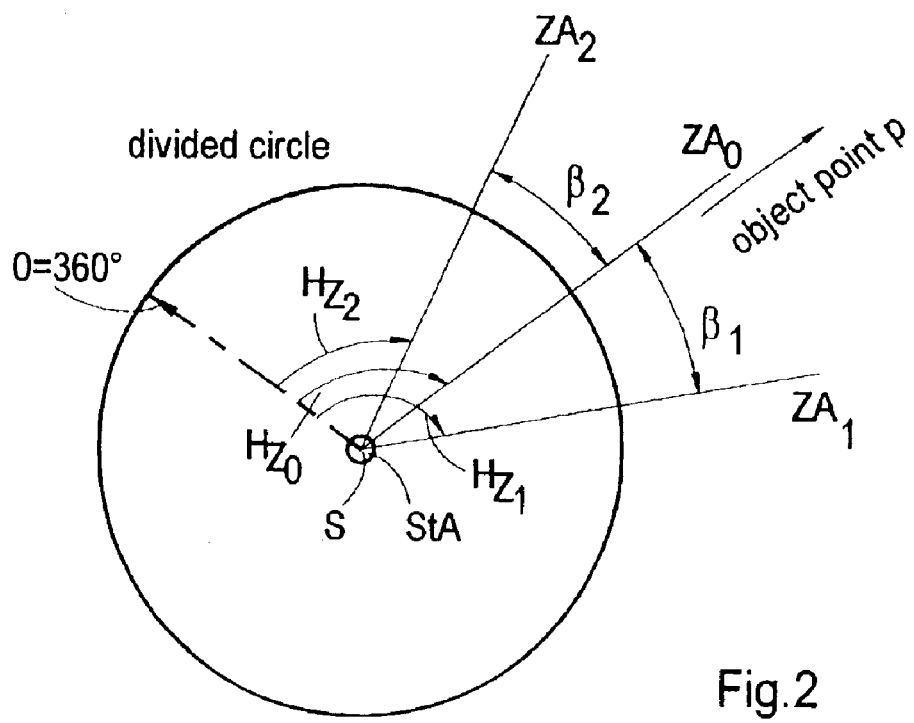
FIG. 2 is a schematic representation of the angular positions of the sighting axes where the sighting axes and the tilt axis lie in one plane.

Considerations analogous to those made with respect to the vertical angle $V_n$ are undertaken for the optical arrangements with their optical or sighting axes $ZA_n$, which lie in the same plane as the tilt axis, i.e., the tilt axis KA itself lies in this plane and the optical axes or the sighting axes $ZA_n$ do not exclusively stand vertically on the tilt axis KA. Here, the angles $\beta_n$ are considered. For the sake of simplicity, this is done for the case when the angles $\alpha_n$ are zero. For this reason, the angles $\beta_n$ are being related to the horizontal angle $Hz_n$. FIG. 2 shows these angular relationships in a plan view on a horizontal divided circle.

Figure 1C:
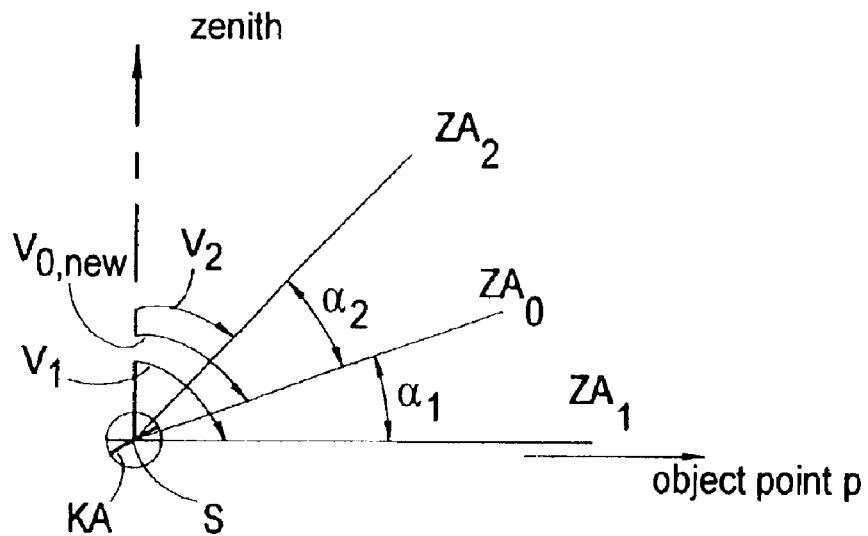
FIG. 1c is a schematic representation of the position of the sighting axes in an alternative sighting done through a sighting axis other than in FIG. 1b.
Figure 1D:
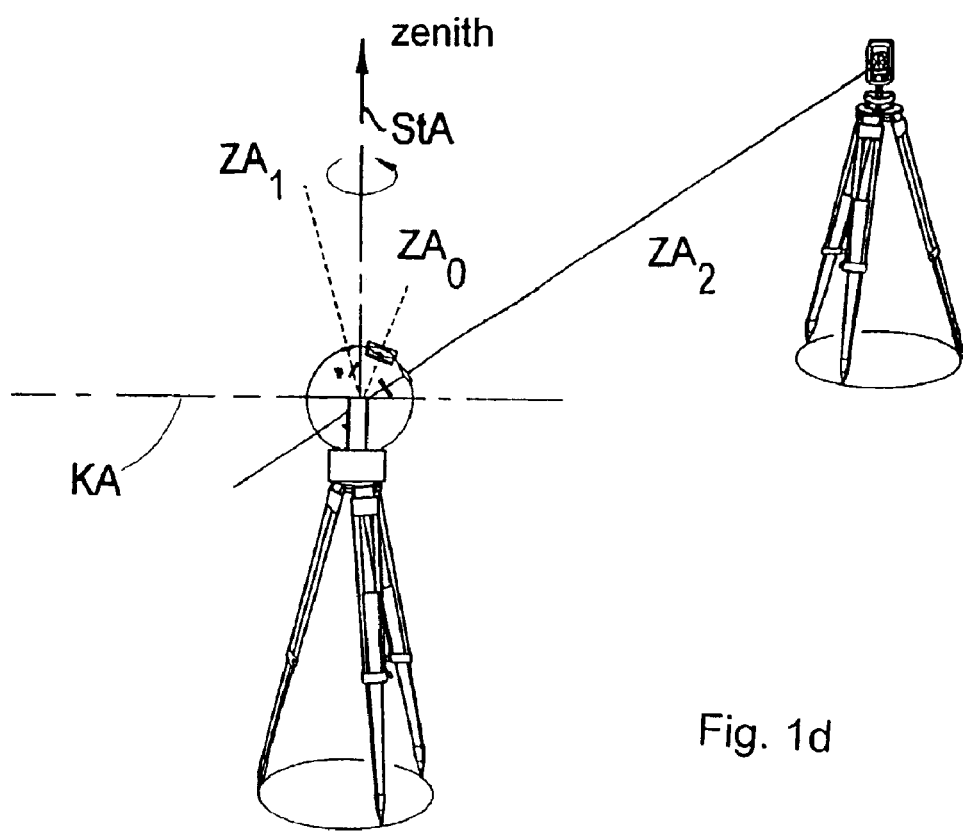
FIG. 1d illustrates several exemplary sighting axes in a three dimensional coordinate space to demonstrate the relationship of each sighting axis with relation to the tilt and vertical axes of a surveying instrument according to an embodiment of the present invention.

In an analogous manner to the above description with reference to FIGS. 1b and 1c, the following relationship results in a general form for an object point on the horizontal divided circle observed at a horizontal angle $Hz_0$ at the position i when there is a changeover to another optical or sighting axis:

$$Hz_{0,i+1} = Hz_{0,i} - \beta_{n,m} \qquad [5]$$

The following equation then results for the direction of an optical or sighting axis $ZA_m$ at the position $Hz_{0,i+}1$:

$$Hz_{m,i+1} = Hz_{0,i+1} + \beta_{n,m} \qquad [6]$$

Since the angles $\beta_n$ have the same effect as a side collimation error, the above equations apply, strictly speaking, only to a sight that lies in the horizon. If work is performed at a vertical angle other than 90° (100 gon), corrections must be made that are known in surveying. In so doing, it is assumed that the optical or sighting axis $ZA_0$ stands vertically on the vertical axis StA and is not subject to a side collimation error.

Accordingly, the formulas applicable to the general case read as follows:

$$Hz_{0,i+1} = Hz_{0,1} - \beta_{n,m}/\sin(V) \qquad [7] \text{ and}$$

$$Hz_{m,i+1} = Hz_{0,i+1} - \beta_{n,m}/\sin(V) \qquad [8]$$

Figure 3:
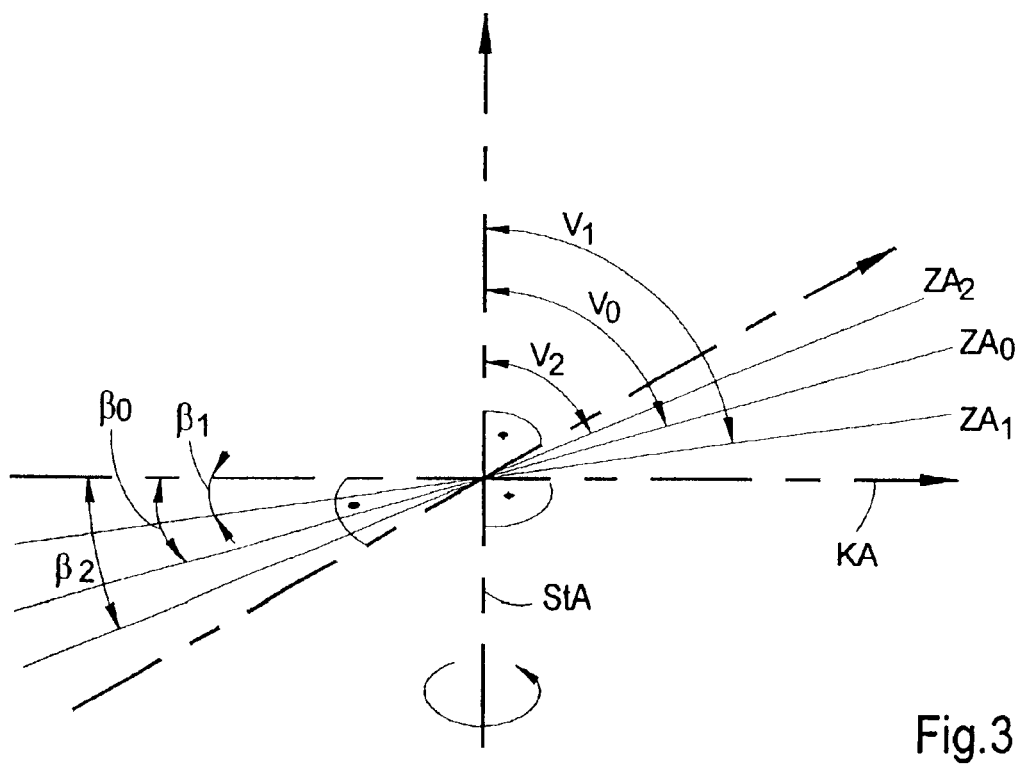
FIG. 3 is a schematic representation of the position of the vertical, tilt and sighting axes with respect to each other, with the sighting axes forming an angle with the tilt axis that is unequal to 90°.

FIG. 3 shows the position of the sighting axes $ZA_0$ to $ZA_2$, which form angles with tilt axis KA that are not equal to 90° and whose vertices lie at the intersection point of vertical axis StA and tilt axis KA. The angles $\beta_0$ to $\beta_2$ are angles that can be produced by rotating the upper part is about the vertical axis StA. The angles $V_0$ to $V_2$, again, denote vertical angles, which the sighting axes $ZA_0$ and $ZA_2$ form with the vertical axis StA. The sighting axes can be aligned with a target by properly rotating the upper part at an angle $\beta$, which is dependent on the vertical angle V, about the vertical axis StA and by setting a relevant angle about the tilt axis KA for the telescope body. The angle at which the target object is located in relation to the plumb-line direction, as seen from the surveying instrument, is regarded as the vertical angle V.

If one proceeds, as depicted in FIG. 3 in simplified form, from an arbitrary arrangement of the optical or sighting axes and stipulate as the only condition that the sighting axes $ZA_0$ to $ZA_2$ intersect at the intersection point S of vertical axis StA and tilt axis KA, the connection of the optical axes with the angle-measuring devices of the surveying instrument can be described by a relevant combination of the angles $\alpha$ and $\beta$.

Figure 6:
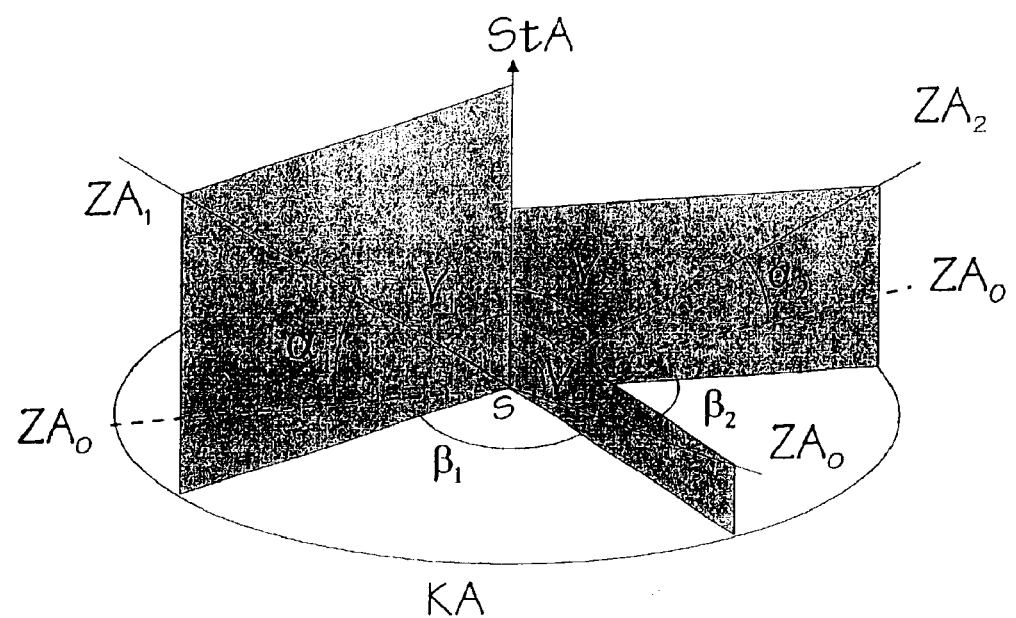
FIG. 6 is a schematic representation of the position of the vertical, tilt and sighting axes with respect to each other showing additional exemplary sighting axes than those shown in FIG. 3.

Referring to FIG. 6, another view is provided which shows the sighting axes $ZA_0$ to $ZA_2$, which form angles with tilt axis KA that are not equal to 90° and whose vertices lie at the intersection point of vertical axis StA and tilt axis KA. As illustrated, the vertical axis StA is oriented substantially vertically to the page. The tilt axis KA is illustrated as a plane orthogonal to the vertical axis StA. The sighting axes $ZA_0$ to $ZA_2$ are projected in the three dimensional coordinate space defined by the vertical axis StA and the tilt axis KA, and intersect at a common intersection point S.

In order to effect the changeover from an optical arrangement n for an object point P to another optical arrangement m, a change of direction in the vertical line from $V_{0,1}$ to $V_{0,i+1}$ is required. The following relationship applies:

$$V_{0,i+1} = V_{0,1} - \alpha_{n,m} \qquad [9]$$

By way of analogy, the relevant optical or sighting axis m appears at the vertical angle $$V_{m,i+1} = V_{0,i+1} \alpha_{n,m} \qquad [10]$$

Consequently, the following applies to the horizontal direction $Hz_{0,i+1}$ to be set:

$$Hz_{0,i+1} = Hz_{0,1} - \beta_{n,m}/\sin(V_{m,i+1}) \qquad [11]$$

The horizontal direction, in which the object point P is seen with the sighting axis $ZA_m$, corresponds to the relationship $$Hz_{m,i+1} = Hz_{0,i+1} + \beta_{n,m}/\sin(V_{m,i+1}) \quad [12].$$

The angles $\alpha_{n,m}$ and $\beta_{n,m}$ represent the angles between an optical or a sighting axis n and another optical or sighting axis m in each of their horizontal and vertical components.

Figure 4:
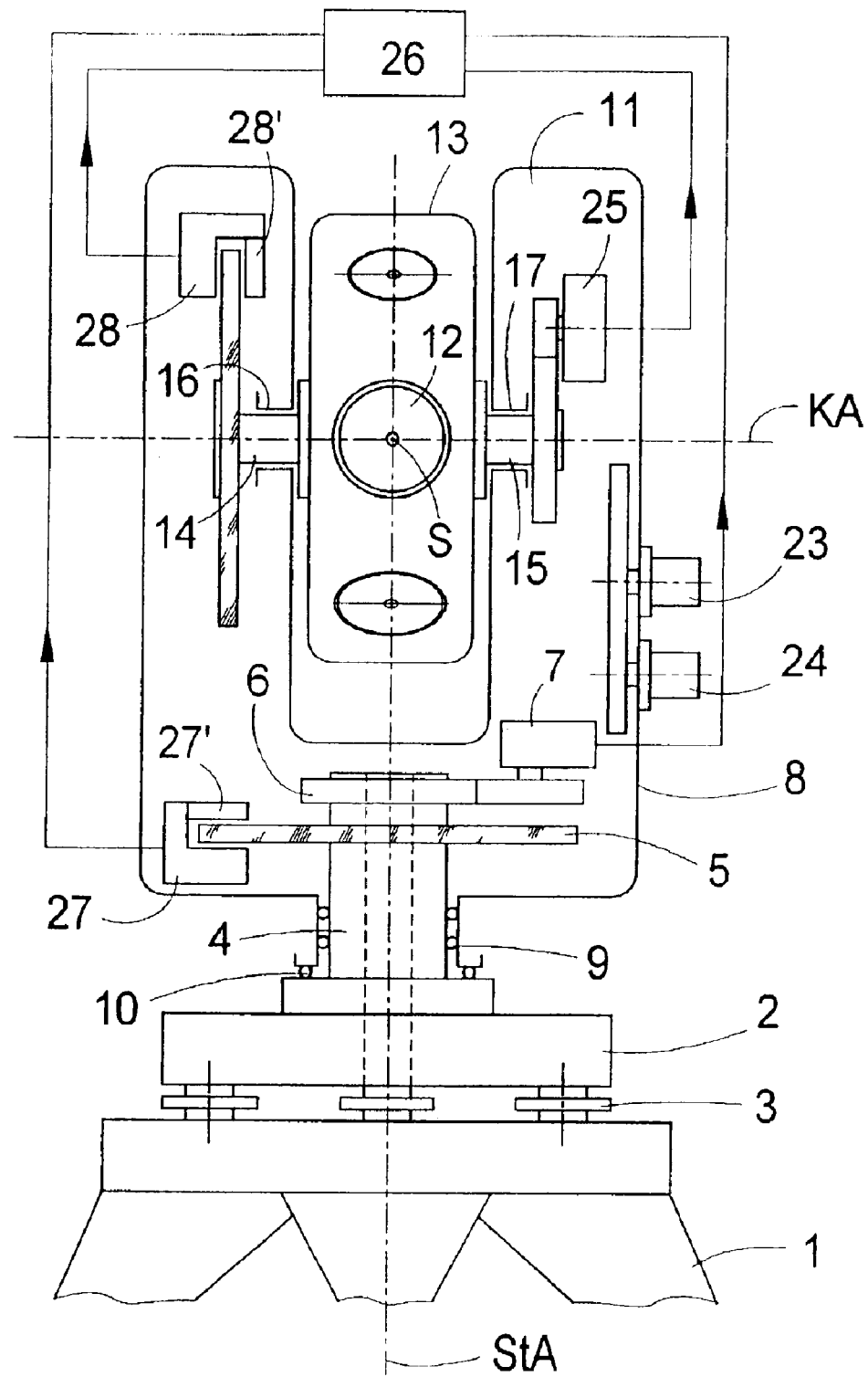
FIG. 4 is a simplified front view of a surveying instrument.

Referring to FIG. 4, a surveying instrument, for example, a video tacheometer, a theodolite or any other instrument used in geodetic surveying for measuring angles or distances is shown in a simplified fashion. The surveying instrument comprises a fixable lower part mostly attached to a tripod 1, which is equipped with a tribrach 2 with foot screws 3 for fastening and leveling the instrument. A push-on sleeve for receiving a positive centering system is known to be used with such surveying instruments, but is not shown for the sake of simplicity. The surveying instrument also includes a system of vertical axes 4 with a horizontal circle 5 and a gear wheel 6 of a horizontal drive 7.

An upper part 8 of the surveying instrument is mounted in bearings 9 and 10 so that it can be pivoted about a vertical axis StA, and is placed on the system of vertical axes 4. The rotatable upper part 8 includes, among other things, a support 11 and a telescope body 13, which comprises a telescope 12 and is swivelable about the tilt axis KA owing to journals 14 and 15 mounted in bearings 16; 17 located in the support 11.

Figure 5:
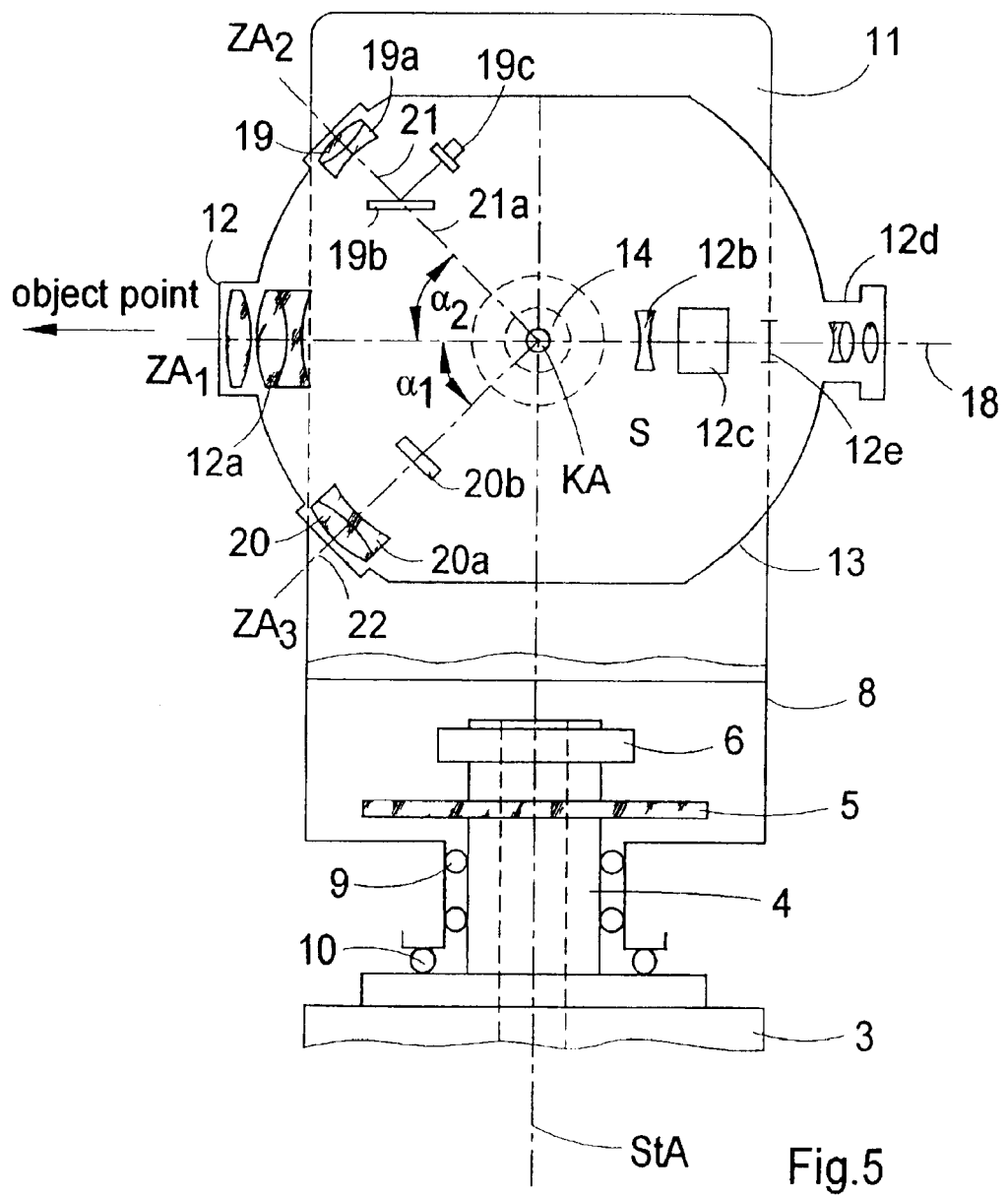
FIG. 5 is a side view of the surveying instrument shown in FIG. 4.

As demonstrated in FIG. 5, the telescope 12 comprises an objective 12a, a focusing element 12b, an image inversion system 12c and an eyepiece 12d with a graticule 12e. The optical axis 18 of the telescope 12 is equally a sighting axis $ZA_1$, which is directed at an object (target). Apart from the telescope 12, further optical arrangements implementing optical beam paths are provided, such as an illuminating beam path 19 with objective 19a, deflecting element 19b and light source 19c, as well as a CCD camera 20 with imaging lens 20a and matrix receiver element 20b, whose optical axes 21 and 22 form additional sighting axes $ZA_2$ and $ZA_3$. The deflecting element 19b deflects the beam path 19. With such an illuminating beam path 19, information can be exchanged, for instance, between the measuring spot (place where the surveying instrument is located) and the target spot (position of the target) or a collimating mark can be projected onto the target spot. It should be mentioned briefly at this point that an optical arrangement for a coudé optical beam can also be placed inside the telescope body. Notably, the optical axes 18, 21 and 22 or the straight extension 21a of the optical axis 21 going through the objectives 12a, 19a and 20a run through the common intersection point S, which lies at the intersection point of vertical axis StA and tilt axis KA.

In a simplified manner, FIG. 5 illustrates a surveying instrument where the optical axes 18, 21 and 22, which correspond to the sighting axes $ZA_1$ to $ZA_3$, run vertically to the tilt axis KA. Surveying instruments with optical arrangements inside a telescope body, whose optical or sighting axes intersect the tilt axis KA at angles other than 90° are equally conceivable, however, so long as the optical or sighting axes $ZA_1$; $ZA_2$ (FIG. 2) intersect the tilt axis KA at the intersection point S or close to it.

Further, the surveying instrument comprises adjustment devices 23 and 24 for manually adjusting the telescope body 13 about the tilt axis KA and the upper part 8 about the vertical axis StA.

These adjustment devices 23 and 24 can effect the relevant mechanical rotation of the telescope body 13 and the upper part 8 in the well-known way. It is an advantage, however, if the adjustment devices 23 and 24 only act on the vertical drive 25 or the horizontal drive 7 via transducers (not shown herein), with the aid of a computer 26. Motorized tacheometer drives of this type are known. Essentially, the computer 26 reads a measuring system 27 for the horizontal angle Hz, and a measuring system 28 for the vertical angle V. The computer 26 further controls the motors for the horizontal drive 7 and the vertical drive 25 on the basis of the angles Hz picked up by a transducer 27' and the angle V identified by an angular-motion transducer 28', so that certain angles are set. The certain angles may, for instance, have been predetermined by the adjustment devices 23 and 24.

The angles are set according to the relationships defined above, so that the relevant angle is adjusted when a new optical axis (sighting axis ZA) is set for a given target position and is kept at the desired value by the motorized drive. This can also be done in a simple manner by switching means (not shown), which switch off the drive in question when the desired angle is reached. On the other hand, a known control loop, through which the computer 26 keeps the desired angle constant, can also be provided.

The computer 26, which also controls the horizontal drive 7 and the vertical drive 25, is located in the upper part 8 and swivels the telescope body 13 about the tilt axis KA (rotation of the telescope body about the tilt axis). Using the computer 26, the measured values can be processed and the measurement results can be determined, displayed and recorded. Also, the angles corresponding to the various target positions or sighting axes ZA can be stored in the memory of the computer 26. An optical arrangement can then be set from one target position to another by a relevant command.

Owing to the motorized computer-controlled adjustment of the telescope body 13 and/or the upper part 8, easy automatic switching between the various optical arrangements is possible.

As a matter of principle, mechanical arresters, for example, taking the form of a locking device or suitable mechanical stops such as detents, can also be provided for positioning and fixing the optical arrangements at a desired target position. For this purpose, one or more of those arresters are arranged between the support 11 and the telescope body 13 for each of these sighting axes ZA. The above mechanical arrestors can be constructed in such a way that they are adjustable and lockable in relation to the telescope body 13.

Figure 7:
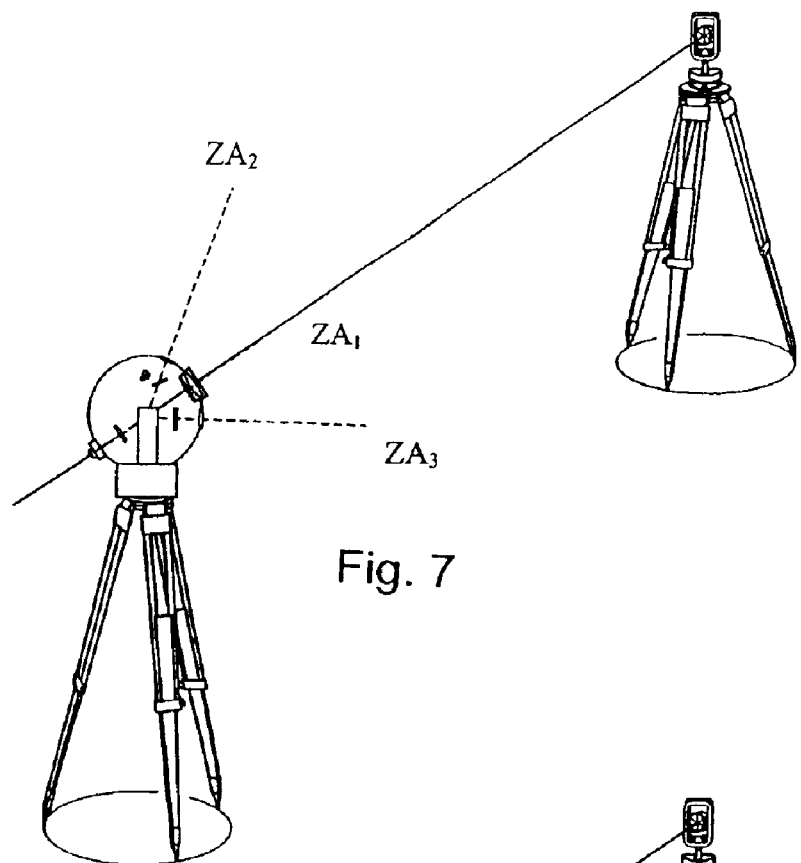
FIG. 7 illustrates a surveying instrument with several exemplary sighting axes projecting in a three dimensional coordinate space where a first one of the sighting axes is directed towards a target.
Figure 8:
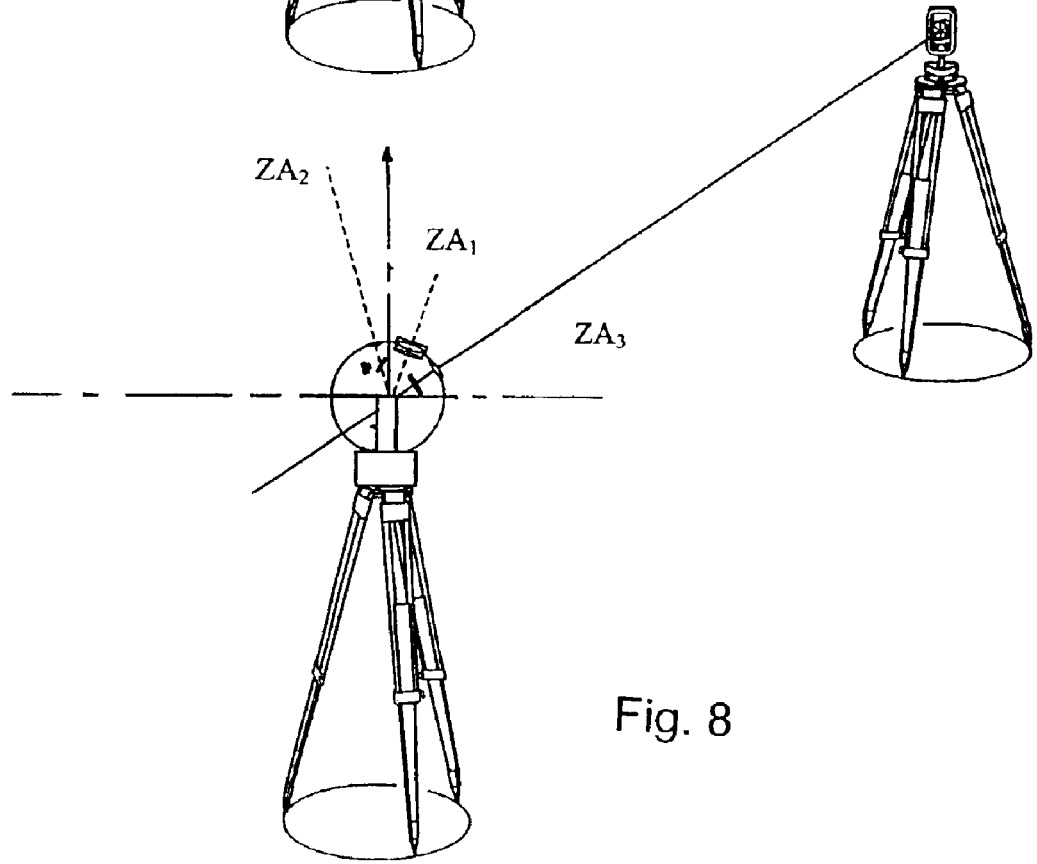
FIG. 8 illustrates the surveying instrument of FIG. 7 where a second one of the sighting axes is directed towards the target.

Referring to FIG. 7, one example of the use of a survey instrument according to at least one embodiment of the present invention is illustrated. The survey instrument has a plurality of sighting axis $ZA_0$ to $ZA_2$. As shown, the sighting axis $ZA_1$ is directed towards a target. Referring to FIG. 8, the same survey instrument shown in FIG. 7 is again illustrated, however, the sighting axes $ZA_0$ to $ZA_2$ have been reoriented on the survey instrument such that now the sighting axis $ZA_2$ is directed towards the target.

LIST OF REFERENCE NUMBERS

1 Tripod
2 Tribrach
3 Foot Screws
4 System of Vertical Axes
5 Horizontal Circle
6 Gear Wheel
7 Horizontal Drive
8 Upper Part
9,10 Bearings 11 Support
12 Telescope
12a Objective
12b Focusing Element
12c Inage Inversion System
12d Eyepiece
12e Graticule
13 Telescope Body
14,15 Journals
16,17 Bearings
18 Optical Axis
19 Illuminating Beam Path
19a Objective
19b Deflecting Element
19c Light Source
18 CCD Camera
20a Imaging Lens
20b Matrix Receiver Element
21, 22 Optical Axes
21a Straight Extension
23, 24 Adjustment Devices
25 Vertical Drive
26 Computer
27, 28 Measuring Systems
27' Transducer
28' Angular-Motion Transducer
α,β Angles
Hz Horizontal Angle
KA Tilt Axis
P Object Point
S Intersection Point
StA Vertical Axis
V Vertical Angle
ZA Sighting Axis Having described the invention in detail and by reference to preferred embodiments thereof, it will be apparent that modifications and variations are possible without departing from the scope of the invention defined in the appended claims.

What is claimed is:

1. A multiple beam path surveying instrument comprising:
    an upper part that can be rotated about a vertical axis, said upper part including a telescope body that is swivelable about a tilt axis, wherein said vertical and tilt axes orthogonally intersect at an intersection point; and
    at least two optical arrangements with optical beam paths set up in said telescope body such that each of said optical beam paths defines an optical axis that encloses a resultant angle that includes a vertex that lies substantially at said intersection point of said vertical axis and said tilt axis.

2. The multiple beam path surveying instrument according to claim 1, further comprising a fixed lower part for receiving said upper part.

3. The multiple beam path surveying instrument according to claim 1, wherein said telescope is mounted in bearings located in a support within said upper portion.

4. The multiple beam path survey instrument according to claim 1, further comprising at least one of a driving device and an adjustment device for rotating said upper part about said vertical axis.

5. The multiple beam path survey instrument according to claim 1, further comprising at least one of a driving device and an adjustment device for rotating said telescope body about said tilt axis.

6. The multiple beam path survey instrument according to claim 1, further comprising a measuring system for determining a first rotational angle of said upper part about said vertical axis and a second rotational angle of said telescope body about said tilt axis.

7. The multiple beam path survey instrument according to claim 1, further comprising a computer system for evaluating measurement results of a first rotational angle of said upper part about said vertical axis and a second rotational angle of said telescope body about said tilt axis.

8. The multiple beam path survey instrument according to claim 7, wherein said computer system further performs at least one function of determining, displaying and recording said measurement results.

9. The multiple beam path survey instrument according to claim 7, wherein said computer system further performs the function of controlling at least one of a driving device and an adjustment device for rotating said upper part about said vertical axis.

10. The multiple beam path survey instrument according to claim 7, wherein said computer system further performs the function of controlling at least one of a driving device and an adjustment device for rotating said telescope body about said tilt axis.

11. The multiple beam path survey instrument according to claim 1, wherein said survey instrument can adjustably select a desired one of said at least two optical arrangements to a desired target position by swiveling said telescope body about said tilt axis.

12. The multiple beam path survey instrument according to claim 1, wherein at least a portion of each optical axis encloses an angle vertical to said tilt axis.

13. The multiple beam path survey instrument according to claim 1, wherein at least a portion of at least one optical axis encloses an angle that is not vertical to said tilt axis.

14. The multiple beam path surveying instrument according to claim 1, wherein at least one of said at least two optical arrangements comprises a camera beam path with objective and matrix receiver element.

15. The multiple beam path survey instrument according to claim 1, wherein at least one of said at least two optical arrangements comprises an optical arrangement that projects target marks on at least one of a target or an object are provided in said telescope body.

16. The multiple beam path survey instrument according to claim 1, wherein at least one of said at least two optical arrangements comprises a sighting device.

17. The multiple beam path survey instrument according to claim 1, wherein mechanical arresters are provided for positioning and fixing a select one of said at least two optical arrangements in a desired target position relative to said vertical axis.

18. The multiple beam path survey instrument according to claim 17, wherein said mechanical arresters comprise mechanical stops.

19. The multiple beam path survey instrument according to claim 1, wherein electric switching means are provided for positioning and fixing a select one of said at least two optical arrangements in a desired target position.

20. The multiple beam path survey instrument according to claim 19, wherein said switching means are controlled by a computer.

21. A multiple beam path surveying instrument comprising:
    an upper part that can be rotated about a vertical axis, said upper part including a telescope body that is swivelable about a tilt axis, wherein said vertical and tilt axes orthogonally intersect at an intersection point;
    at least two optical arrangements with optical beam paths set up in said telescope body such that each optical beam defines an optical axis that encloses a resultant angle that includes a vertex: that lies substantially at said intersection point of said vertical axis and said tilt axis;

at least one of a first driving device and a first adjustment device for rotating said upper part about said vertical axis;

at least one of a second driving device and a second adjustment device for rotating said upper part about said tilt axis;

a measuring system for determining a first rotational angle of said upper part about said vertical axis and a second rotational angle of said telescope body about said tilt axis; and a computer system for evaluating measurement results of a first rotational angle of said upper part about said vertical axis and a second rotational angle of said telescope body about said tilt axis.

22. The multiple beam path survey instrument according to claim 21, wherein said computer system further performs at least one function of determining, displaying and recording said measurement results.

23. The multiple beam path survey instrument according to claim 21, wherein said computer system further performs the function of controlling the rotation of said upper part about said vertical axis and controlling the rotation of said telescope body about said tilt axis.

24. The multiple beam path survey instrument according to claim 21, wherein at least a portion of each optical axis encloses an angle vertical to said tilt axis.

25. The multiple beam path survey instrument according to claim 21, wherein at least a portion of at least one optical axis encloses an angle that is not vertical to said tilt axis.

26. The multiple beam path surveying instrument according to claim 21, wherein at least one of said at least two optical arrangements comprises a camera beam path with objective and matrix receiver element.

27. The multiple beam path survey instrument according to claim 21, wherein at least one of said at least two optical arrangements comprises an optical arrangement that projects target marks on at least one of a target or an object are provided in said telescope body.

28. The multiple beam path survey instrument according to claim 21, wherein at least one of said at least two optical arrangements comprises a sighting device.

29. The multiple beam path survey instrument according to claim 21, wherein mechanical arresters are provided for positioning and fixing a select one of said at least two optical arrangements in a desired target position relative to said vertical axis.

30. The multiple beam path survey instrument according to claim 29, wherein said mechanical arresters comprise mechanical stops.

31. The multiple beam path survey instrument according to claim 21, wherein electric switching means are provided for positioning and fixing a select one of said at least two optical arrangements in a desired target position.

32. The multiple beam path survey instrument according to claim 31, wherein said switching means are controlled by said computer.

33. A method of providing multiple beam paths in a surveying instrument comprising:

providing an upper part that can be rotated about a vertical axis, said upper part including a telescope body that is swivelable about a tilt axis, wherein said vertical and tilt axes orthogonally intersect at an intersection point;

providing at least two optical arrangements with optical beam paths set up in said telescope body; and orienting each optical arrangement such that an associated optical beam path defines an optical axis that encloses a resultant angle that includes a vertex that lies substantially at said intersection point of said vertical axis and said tilt axis.

* * * * *

UNITED STATES PATENT AND TRADEMARK OFFICE
CERTIFICATE OF CORRECTION

PATENT NO. : 6,873,407 B2
DATED : March 29, 2005
INVENTOR(S) : Michael Vogel

It is certified that error appears in the above-identified patent and that said Letters Patent is hereby corrected as shown below:

Column 5,
Line 40, "$V_{0.1}$" should read -- $V_{0,1}$ --.

Column 6,
Lines 25-26, "is about the vertical" should read -- about the vertical --.
Line 54, "arrangement n for" should read -- arrangement $n$ for --.
Lines 54-55, "arrangement m," should read -- arrangement $m$, --.
Line 60, "axis m" should read -- axis $m$ --.
Line 63, "$V_{m,i+1} = V_{0,i+1} \alpha_{n,m}$" should read -- $V_{m,i+1} = V_{0,i+1} + \alpha_{n,m}$ --.

Column 7,
Line 7, "axis n" should read -- axis $n$ --.
Line 8, "axis m" should read -- axis $m$ --.

Signed and Sealed this

Sixteenth Day of August, 2005

JON W. DUDAS
*Director of the United States Patent and Trademark Office*